Nov. 11, 1969     R. D. RING     3,477,685

PATTERN TRACING INSTRUMENT

Filed April 18, 1966     2 Sheets-Sheet 1

INVENTOR.
ROGER D. RING

BY
ATTORNEYS

Nov. 11, 1969   R. D. RING   3,477,685

PATTERN TRACING INSTRUMENT

Filed April 18, 1966   2 Sheets-Sheet 2

INVENTOR.
ROGER D. RING

BY
ATTORNEYS

# United States Patent Office 3,477,685
Patented Nov. 11, 1969

3,477,685
PATTERN TRACING INSTRUMENT
Roger D. Ring, 1305 I Ave., National City, Calif. 92050
Filed Apr. 18, 1966, Ser. No. 543,127
Int. Cl. B23q *35/18;* F16k *35/10, 51/00*
U.S. Cl. 251—3
7 Claims

ABSTRACT OF THE DISCLOSURE

A pattern tracing instrument, the main body of which forms a bearing for a hollow nutatable rod. The rod forms a longitudinally extending bearing for a reciprocating stylus guide. One end of a stiff, resilient wire is fixed to the stylus guide and the other end is fixed to a spool of a spool type bearing. A collar surrounds the rod and the rod is movable axially through the collar. Stiff resilient wires are fixed to the collar and to spools, the axes of which are disposed at angles to the axis of the first mentioned spool.

---

The present invention relates to a universal tracing instrument and more particularly to an improved valve for controlling the flow of fluid which is not only useful in connection with the aforesaid instrument, but is also employable wherever the flow of fluid is to be controlled.

The instrument of the present invention comprises a main body which carries three hollow cylinders, each containing, respectively, a spool type valve. The axis of one of these cylinders extends vertically and the axis of the other two extend horizontally at right angles with respect to the vertical extending axis of the first mentioned cylinder and at right angles with respect to one another. A hollow rod forming part of a stylus, is pivotally carried for nutational movement by the main body. This rod is closely embraced by a collar for moving the collar in response to nutation of movement of the collar. One end of each of two resilient and relatively stiff wires is connected with the collar and the other ends of each of the wires is connected, respectively, to the respective spool type valve. Nutating movement of the rod imparts movements to the spools.

A stylus head is reciprocally disposed in the hollow rod and extends through the lower end of the rod. A resilient and relatively stiff wire is disposed within the hollow rod. One end of this wire is connected with the top of the stylus head and the other is connected with the spool type valve which is disposed in the cylinder having the vertically extending axis. The raising and lowering of the stylus head imparts like movement to the latter mentioned spool type valve.

Each of the cylinders includes at least two bodies having aligned and inner cylindrical surfaces of like diameter. At least one of these valve bodies has a surface which is offset longitudinally of another surface of the same body. A ring is disposed between these bodies and is provided with an inner surface, preferably circular, which is spaced outwardly at a greater distance from the axis of the cylindrical surfaces of the bodies than said cylindrical surfaces. The spool valve is adapted to be moved by any suitable means, such as one of the aforesaid wires for effecting movement of the groove in the spool valve to and from registering positions with the area within the ring.

In one embodiment of the invention, the aforesaid offset is attained by forming the end faces of the bodies, which end faces confront side faces of the ring, at acute and obtuse angles with respect to the axis of the bodies.

In another embodiment of the invention, the aforesaid offset is attained by forming at least one groove in an end face of one of the bodies, one end of the groove terminating short of the peripheries of the said one body and the ring and the other end of the groove terminating at the inner cylindrical surface of the said one body.

Other features and the advantages of this invention will be apparent from the following description, reference being had to the accompanying drawings, wherein preferred embodiments of the invention are illustrated.

Figure 1:
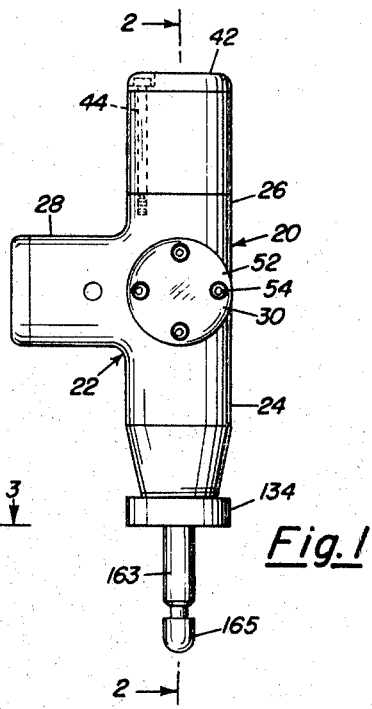
FIG. 1 is a side view of the universal pattern tracing instrument.

Referring more in detail to the drawings, the universal pattern tracing instrument is shown at 20 and includes a main body 22 including a lower section 24, an upper section 26 and two side sections 28 and 30. The top 32 of section 26 carries a hollow, cylindrical body 34 having desirable ports. A cylinder 40 is disposed within the body 34. The bottom of this cylinder rests upon the top 32 of the section 26 and the upper end of the hollow body 34 and cylinder 40 are closed by a cap 42. The cap 42, the cylinder 40 and the body 34 are held in place by a series of bolts, only one of which is shown in dotted lines at 44 in FIG. 1.

Sections 28 and 30 are in the form of hollow cylinders and carry, respectively, cylinders 46 and 48. The outer ends of the sections 28 and 30 are closely by caps 50 and 52, respectively, and the caps are held in place by screws 54.

Each of the cylinders 40, 46 and 48 is provided with at least two bodies and at least one ring interposed between these bodies. In the present embodiment, each of the cylinders is provided with three bodies, herein shown at 56, 58 and 60. The circular openings in the rings 62 and 68 are of larger diameter than the bore in the bodies 56, 58 and 60 to provide fluid areas 74 and 76 respectively. The body 56 is provided with a port 78. The ring 62 is provided with a port 80 and the body 58 is provided with a port 82. The ring 68 is provided with a port 84 and the body 60 is provided with a port 86. Preferably, the bodies 56, 58 and 60 and the rings 62 and 68 are pressed in position in the respective sections 28, 30 and 34.

Each of these cylinders 40, 46 and 48, receives a spool type valve 88 having angular grooves 90, 92 and 94. Lands are formed on the periphery of the spool and are closely embraced by the cylinder provided by the bodies 56, 58 and 60. Land 96 is disposed on one side of the groove 90; a land 98 is disposed between grooves 90 and 92; a land 100 is disposed between grooves 92 and 94 and as is shown in FIG. 4; a land 102 is disposed on the opposite side of groove 94.

The spool is adapted to be reciprocated in the cylinder formed by the bodies 56, 58 and 60. When the spool valve 88 is in its intermediate position, as shown in FIG. 4, groove 90 registers with port 78; land 98 covers the area 74 of the ring 62; groove 92 registers with port 82; land 100 covers the area 76 of the ring 68; and groove 94 registers with the port 86 and the body 60. Thus, there can be no flow between port 78 and port 80 because the land 98 blocks the area 74 and the ring 62. Nor can there be any flow of fluid between the port 80 and the port 82 because the land 98 blocks the area 74 in ring 62. Nor can there be any flow of fluid between port 82 and port 84 because the land 100 blocks the flow of fluid to the area 76 and the ring 68. Nor can there be any flow of fluid between the port 84 and port 86 because the land 100 blocks the flow of fluid through the area 76 in ring 68. The land 96 seals with the cylinder portion 56 and the land 102 seals the cylinder portion 60 so as to prevent the flow of fluid through the ends of the cylinder.

When the spool 88 is moved to its extreme right position, registration is maintained between the groove 90 and the port 78; registration is maintained between the groove 92 and the port 82; intercommunication is established between groove 90 and the area 74 surrounded by ring 62 so as to establish intercommunication between port 78 and port 80. Intercommunication is established between port 82 and the area 76 surrounded by ring 68, whereby intercommuniaction is established between port 82 and port 84. When the spool 88 is moved to its extreme left position, intercommunication is established between port 80 and port 82 through the area 74 surrounded by the ring 62 and the groove 92; and intercommunication is established between port 84 and port 86 through the area 76 surrounded by the ring 68 and the groove 94.

Figure 4:
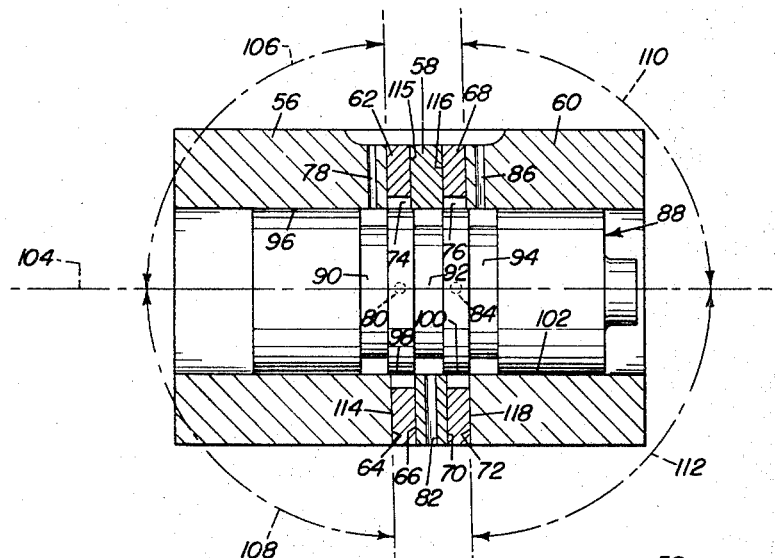
FIG. 4 is a view, partly in section, of one of the cylinders, the section being taken along line 3—3 of FIG. 2, but on a larger scale, showing the spool valves in a position in which the grooves thereof are not in registry with the area within the rings.
Figure 5:
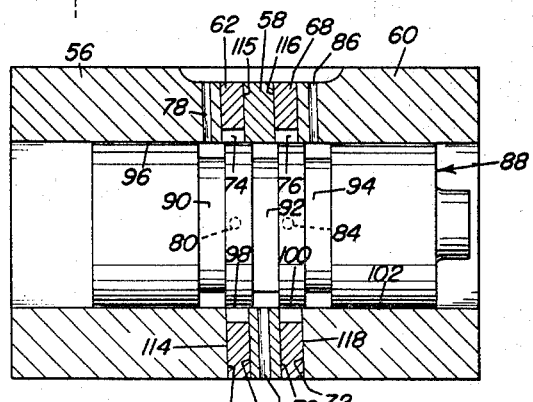
FIG. 5 is a view similar to FIG. 4 but showing the spools in a position in which part thereof is in registry with the area confined by the rings.

It will be observed from FIGS. 4 and 5 that the end faces 64 and 72 of bodies 56 and 60 are not perpendicular with respect to the axis 104 of the cylinders, said axis being shown by dot and dash lines 104. It will be observed from the dot and dash line 106 that the upper half of body 56 is disposed at an acute angle with respect to the axis 104; and it will also be observed by the dot and dash lines 108, that the lower half of the end face 64 of body 56 is at an obtuse angle with respect to the axis. It will also be observed, by the dot and dash line 110, that the upper half of the end face 72 of body 60 is at an obtuse angle with respect to the axis 104 and the lower half ot said surface 72, as indicated by dot and dash lines 112, is at an acute angle with respect to said axis. Thus, it will be seen that the lower half of the body 56 is offset longitudinally to the right with respect to the upper half of the surface 64 and that the lower half of said surface 72 of body 60 is offset laterally to the right with respect to the upper half of said surface 72.

This offsetting is exaggerated in the drawing for the purpose of illustration only. In actual practice, in a valve having a one inch diameter spool, the offsetting is approximately .001 of an inch. It will be observed from FIG. 5 that upon slight movement of the spool from the position shown in FIG. 4 to that shown in FIG. 5, the upper part of the groove 90 registers with the area 74 while the lower part of the groove does not register with the lower part of the area 74 of the ring 62. The purpose of this offset is to eliminate the abrupt flow of fluid when a 360° angular groove is uncovered. The .001 inch angle permits a gradual opening to provide lower flow rate upon opening movement of the spool. Likewise the flow rate is decreased just prior to the full closing movement of the spool.

It will be understood that the side faces 114 and 115 of the ring 62 are parallel and lie in confronting relationship, respectively, with the end faces 64 and 66 of the bodies 56 and 58, and, the end faces 116 and 118 of the ring 68 are parallel and lie parallely with the confronting end faces of the body 58 and 60, respectively. It will also be understood that this innercircular surface of body 58 is aligned with and is of the same diameter as the innercircular surface of the body 56 and body 60. The inner surfaces of the bodies are finished after they are assembled.

Figure 8:
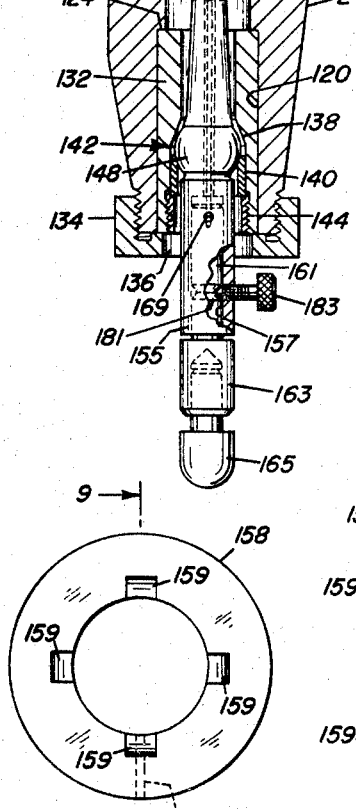
FIG. 8 is an end view of one of the cylindrical valve bodies shown in FIGS. 6 and 7.
Figure 9:
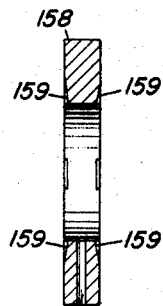
FIG. 9 is a sectional view taken along line 8—8 of FIG. 7.
Figure 6:
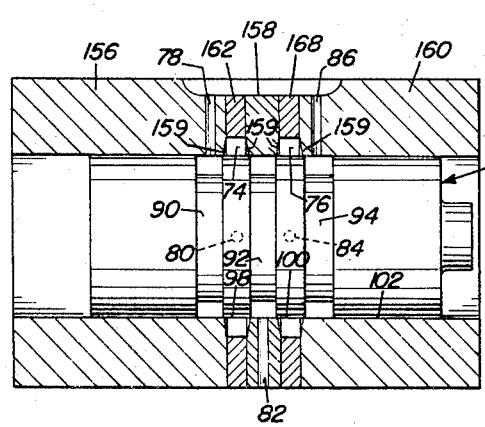
FIG. 6 is a side view similar to FIG. 4, but showing another embodiment of the invention in which grooves are formed in one of the cylinder bodies, with the spool in a position in which it is not in registry with the ring.
Figure 7:
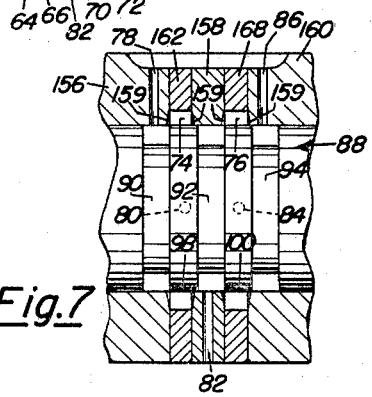
FIG. 7 is a view similar to FIGURE 6, but showing the spool in a position in which it registers with the groove in the ring.

In the embodiment shown in FIGS. 6 and 9, all of the confronting faces of the bodies 156 and 158 and 160 and the rings 162 and 168 are at right angles with respect to the axis of the cylinder. In this embodiment, the offsetting is accomplished by providing at least one groove 159 in the end face of each of the bodies, which confronts the rings 162 and 168. Obviously, the body 158 will be provided with grooves on opposite sides thereof and such is illustrated at 159 in FIGS. 7 and 8. One end of the groove terminates short of the peripheries of the bodies and the ring, and the other end terminates at the inner surface of the body. Thus, it is apparent that as groove 92, for example, approaches the area 76 provided by the ring 168, a slight seepage of fluid can flow through the grooves 159 to thus minimize the abrupt flow. It is to be understood that a groove or grooves is/are provided in the end faces of bodies 156 and 160 which confront, respectively, the side faces of the rings 162 and 168, respectively.

It is apparent that the offset surfaces function to prevent the abrupt flow from the area 74 and 76 to the respective grooves as well as prevent the abrupt flow of fluid from the grooves to the areas 74 and 76.

Figure 2:
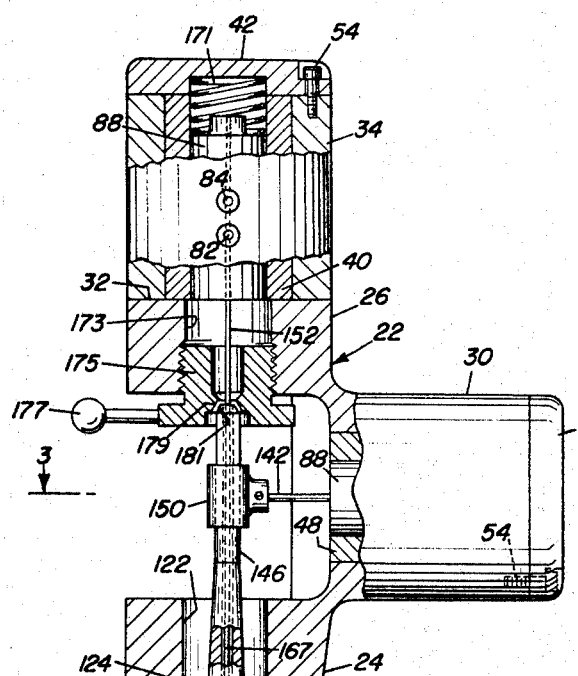
FIG. 2 is a view, partly in section, the section being taken along line 2—2 of FIG. 1, but on a larger scale.
Figure 3:
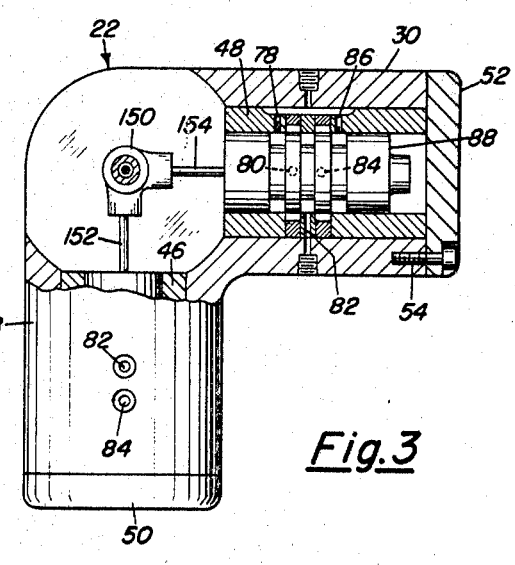
FIG. 3 is a sectional view taken along line 3—3 of FIG. 2.

Referring more particularly to FIGS. 2 and 3, it will be seen that the section 24 is provided with a lower bore 120 and a concentric, but smaller diameter bore 122, to provide a shoulder 124 at their junctions. The bore 120 receives a sleeve 132 which is held in fixed position in the bore 120 by a cap 134, which is threaded onto the lower end of the section 24. Cap 134 is provided with an opening 136. The sleeve is tapered inwardly and upwardly as at 138 to form the upper portion of a socket type bearing. The lower portion of this socket type bearing is provided by a sleeve 140, which is tapered upwardly and outwardly. This bearing will be hereinafter referred to as 142. The sleeve 140 is held in adjusted position by an externally threaded collar 144 which is threaded into the lower end of the sleeve 132. The socket type bearing 142 nutationally carries rod 146 by a bearing 148 on the rod; the bearing is in the form of portions of a sphere.

The upper portion of the rod 146 is of constant diameter and carries a collar 150. A resilient and relatively stiff wire 152 has one end fixed to the collar 150 and the other end fixed ot the spool 88 within the section 28 of the main body 22. The same type of wire 154 has one end fixed to the collar 150 and the other end affixed to the spool within the section 30. Nutating movement can be imparted to the spool in the section 28 or the spool in the section 30 or to both simultaneously, depending upon the direction of the nutation of the rod 146.

The lower end 155 of the rod 146 extends through the sleeve 140, collar 144 and the opening 136 in the cap 134. This end of the rod is provided with a cylindrical bore 157 for receiving a reciprocal guide 161. The lower end of the guide 161 carries an enlarged foot 163 which in turn receives a stylus head 165. This stylus head is semi-spherical at the lower end thereof and follows the pattern to be traced. Thus, it will be seen that as the stylus head 165 is tracing the pattern, nutating movement will be imparted to the collar 150 and thence to the spools 88 through the wires 152 and 154.

The rod 146 is hollow through and longitudinally of the center thereof for receiving a wire 167. The lower end of this wire is fixed to the upper end of the guide 161 by a set screw 169 and the upper end of the wire is fixed to the upper end of the spool 88 in any suitable manner. A spring 171 is interposed between the top of the spool 88 in the cylinder 40 and the cap 42 and normally urges the spool downwardly. Upper movement of the stylus head 165 forces the wire 167 and the spool upwardly; this wire is also resilient and relatively stiff.

The upper section 26 is bored, as at 173 and the lower portion of this bore is threaded internally for receiving an externally threaded sleeve 175 having a manipulating handle 177 affixed thereto. This sleeve 175 is provided with a seat 179 in the form of a hollow frustum of a cone. A complementary seat 181 is formed on the upper end of the stylus rod 146. By raising and lowering the sleeve 175, the gap between the seats 179 and 181 can be increased or decreased, since in this manner, the extent of nutational movement to the wires 152 and 154 and the extent of reciprocal movement to the wire 167 can be controlled, and consequently the degrees of value openings can thus be controlled.

The guide 161 in the lower end of the stylus rod 146 is provided with a V-shaped circular groove 181 for receiving the end of a screw 183. If, for example, it is desirable to trace a pattern which is flat throughout, it is not necessary to actuate the spool 88 in the cylinder 40. By screwing the screw 183 inwardly, a sufficient distance, the guide 161 is locked in position. When it is desirable to use the spool 88 in cylinder 40, the screw 183 can be withdrawn sufficiently to permit the necessary vertical movement to be imparted to said spool 88.

It will be apparent from the foregoing that universal movement can be imparted to the forward end of the stylus and in this manner, the valves can be actuated singly or any two can be actuated independently of the third, and all three can be actuated simultanetously. Thus, the three controls for a cutting tool can be actuated singly or any two can be operated independently of the third or all three may be operated simultaneously. It is also apparent from the foregoing that vertical cutting, only, can be effected if desired or horizontal cutting in any and all directions can be effected, if desired and also angular cutting can be made in any and all directions.

I claim:
1. A universal pattern tracing instrument for actuating valves for controlling fluid to a duplicating machine, comprising in combination:
   (A) an elongated and vertically etxending main body forming a ball type bearing adjacent the lower end thereof;
   (B) an elongated and vertically extending stylus rod within the body, said rod being hollow and forming:
      (1) a longitudinally extending bearing surface adjacent the lower end thereof;
      (2) a bearing in the form of portions of a sphere, said bearing being journaled for nutating movement in the ball type bearing;
   (C) a valve cylinder fixed to the main body, the axis thereof extending substantially longitudinally of the rod;
   (D) a spool type valve within the cylinder;
   (E) a stylus head having a bearing surface slidable in the hollow bearing surface of the rod and having a portion extending to the exterior of the lower end of the rod for tracing the pattern;
   (F) an elongated and resilient, stiff wire having the lower end fixed to the stylus head and extending through the upper end of the hollow rod, the upper end of the wire being fixed to the spool valve;
   (G) a second valve cylinder fixed to the main body, the axis thereof being disposed at substantially right angles with respect to the axis of the first mentioned cylinder and substantially intersecting the rod;
   (H) a spool valve within the second mentioned cylinder;
   (I) collar means surrounding and closely embracing the rod, said rod with the wire therein being longitudinally slidable in the collar means;
   (J) a resilient, stiff wire having one end connected with the collar means and the other end connected with the second mentioned spool;
   (K) a third valve cylinder fixed to the main body, the axis thereof being disposed at substantially right angles to the first and second mentioned cylinders and substantially intersecting said rod;
   (L) a spool valve within the third mentioned cylinder;
   (M) and a resilient, stiff wire having one end connected with the collar means and the other end with the third mentioned spool.

2. A universal pattern tracing instrument as defined in claim 1, characterized to include:
   (N) means urging the stylus head downwardly.

3. A universal pattern tracing instrument as defined in claim 1, characterized in that at least one of the valve cylinders includes:
   (1) a body having a cylindrical inner surface;
   (2) a second body having a cylindrical surface aligned and conforming in diameter with the cylindrical surface of the first mentioned body of said one cylinder said bodies each having a surface offset longitudinally of a contiguous circumferentially extending valving surface which together with the offset surface defines an annular valving edge;
   (3) a ring interposed between said bodies of said one cylinder, said ring having an inner surface spaced radially outwardly at a greater distance from the axis of said cylindrical surfaces of said bodies of said one cylinder than the cylindrical surface of said one body; said stylus head being operable for moving the spool type valve in said one cylinder to and from positions wherein the spool coacts with the annular valving edge to control flow in said valve.

4. A universal pattern tracing instrument as defined in claim 3, characterized in that the end faces of the bodies of said one cylinder, which end faces confront opposite side faces of the ring are disposed at acute and obtuse angles, respectively, relative to the axis of the bodies of said one cylinder to provide said offset.

5. A universal pattern tracing instrument as defined in claim 3, characterized in that an end face of each of the bodies of said one cylinder, which end faces confront a side face of the ring, is provided with at least one groove comprising said offset surface, one end each of the grooves terminating short of the peripheries of the ring and the peripheries of said bodies of said one cylinder and the other ends of each of the grooves terminating at the inner cylindrical surface of the bodies.

6. A universal pattern tracing instrument for actuating valves for controlling fluid in a duplicating machine, comprising in combination:
   (A) a main body forming a socket ball type bearing;
   (B) a stylus rod within the body, said rod being hollow and forming:
      (1) a longitudinal extending bearing surface therein;
      (2) a bearing in the form of portions of a sphere, said latter bearing being journaled for nutating movement in the socket ball type bearing;
   (C) a valve cylinder fixed to the main body, the axis thereof extending substantially longitudinally of the rod;
   (D) a spool type valve within the cylinder;
   (E) a stylus head having a bearing surface slidable in the hollow bearing surface of the rod and having a portion extending to the exterior of the one end of the rod for tracing the pattern;
   (F) a resilient stiff wire having one end connected with the stylus head and extending through the other end of the hollow rod, the said other end of the wire being connected with the spool valve;
   (G) a second valve cylinder fixed ot the main body, the axis thereof being disposed at substantially right angles with respect to the axis of the first mentioned cylinder and substantially intersecting the rod;
   (H) a spool valve within the second mentioned cylinder;
   (I) collar means surrounding and closely embracing the rod, said rod with the wire therein being longitudinally slidable in the collar means;

(J) a resilient, stiff wire having one end connected with the collar means and the other end connected with the second mentioned spool;

(K) a third valve cylinder fixed to the main body, the axis thereof being disposed at substantially right angles to the first and second mentioned cylinders and substantially intersecting said rod;

(L) a spool valve within the third mentioned cylinder;

(M) a resilient, stiff wire having one end connected with the collar means and the other end with the third mentioned spool;

(N) and selective means for preventing relative movement between the stylus head and rod.

7. A universal pattern tracing instrument as defined in claim 6, characterized in that the rod extends vertically, and further characterized to include:

(N) means urging the stylus head downwardly;

(O) means for preventing relative movement between the stylus head and rod.

References Cited

UNITED STATES PATENTS

| | | | |
|---|---|---|---|
| 2,704,956 | 3/1955 | Johnson | 90—62 XR |
| 2,787,437 | 4/1957 | Turchan | 251—3 |
| 2,920,650 | 1/1960 | Moog | 137—625.48 XR |
| 2,958,340 | 11/1960 | Rosebrook | 91—37 XR |
| 2,994,502 | 8/1961 | Ruzick et al. | 251—3 |

FOREIGN PATENTS 678,777    1/1964    Canada.

WILLIAM F. O'DEA, Primary Examiner

R. GERARD, Assistant Examiner

U.S. Cl. X.R.

91—413; 137—625.69; 251—101, 285